(12) United States Patent
Bouchon et al.

(10) Patent No.: US 7,728,448 B2
(45) Date of Patent: Jun. 1, 2010

(54) PROCESS AND APPARATUS FOR REDUCING NITROGEN OXIDE EMISSIONS IN GENSET SYSTEMS

(75) Inventors: Nicolas Bouchon, Vancouver (CA); Heidi Collins, Vancouver (CA); Mathieu Bouvier, Vancouver (CA)

(73) Assignee: Azure Dynamics, Inc., Alberta (CA)

( * ) Notice: Subject to any disclaimer, the term of this patent is extended or adjusted under 35 U.S.C. 154(b) by 451 days.

(21) Appl. No.: 11/800,841

(22) Filed: May 8, 2007

(65) Prior Publication Data

US 2007/0262586 A1  Nov. 15, 2007

(51) Int. Cl.
*H02P 9/04* (2006.01)
(52) U.S. Cl. .................................................. 290/40 C
(58) Field of Classification Search .............. 290/40 C
See application file for complete search history.

(56) References Cited

U.S. PATENT DOCUMENTS

| | | | | |
|---|---|---|---|---|
| 2,916,635 A | * | 12/1959 | Nicita | 290/40 C |
| 3,225,542 A | * | 12/1965 | Hansen et al. | 60/368 |
| 3,261,007 A | * | 7/1966 | Eberhard | 340/870.24 |
| 4,083,052 A | * | 4/1978 | Metcalf | 346/18 |
| 4,407,132 A | | 10/1983 | Kawakatsu et al. | 60/716 |
| 4,475,105 A | * | 10/1984 | Kurosawa | 340/870.25 |
| 4,905,544 A | | 3/1990 | Ganoung | 477/109 |
| 5,327,992 A | | 7/1994 | Boll | 180/65.25 |
| 5,343,970 A | | 9/1994 | Severinsky | 180/65.25 |
| 5,345,761 A | | 9/1994 | King et al. | 60/274 |
| 5,547,433 A | | 8/1996 | Yang | 477/5 |
| 5,898,282 A | | 4/1999 | Drozdz et al. | 318/139 |
| 5,939,794 A | | 8/1999 | Sakai et al. | 290/40 A |
| 6,009,965 A | | 1/2000 | Takanohashi et al. | 180/65.26 |
| 6,083,138 A | * | 7/2000 | Aoyama et al. | 477/5 |
| 6,098,734 A | | 8/2000 | Kawamura | 180/65.245 |
| 6,242,873 B1 | | 6/2001 | Drozdz et al. | 318/139 |
| 6,266,956 B1 | | 7/2001 | Suzuki et al. | 60/278 |
| 6,319,168 B1 | * | 11/2001 | Morris et al. | 477/5 |
| 6,421,599 B1 | | 7/2002 | Lippa et al. | 701/102 |
| 6,480,767 B2 | | 11/2002 | Yamaguchi et al. | 701/22 |
| 6,500,089 B2 | | 12/2002 | Lasson et al. | 477/3 |

(Continued)

FOREIGN PATENT DOCUMENTS

CA  2351911  12/2001

(Continued)

OTHER PUBLICATIONS

Zhang, et al., "Control of Hybrid Dynamical Systems for Electric Vehicles", Proceedings of the American Control Conference, Arlington, VA, Jun. 25-27, 2001, pp. 2884-2889.

(Continued)

*Primary Examiner*—J C Gonzalez
*Assistant Examiner*—Pedro J Cuevas
(74) *Attorney, Agent, or Firm*—Iandiorio Teska & Coleman

(57) ABSTRACT

A process and apparatus for reducing nitrogen oxide emissions in a genset comprising an engine and a generator and a shaft coupled to the engine and generator. The apparatus directs the generator to reduce load on the shaft while directing the engine to seek a steady state shaft speed for a desired energy transfer to the shaft when a shaft speed correction signal representing a shaft speed correction to reach the desired energy transfer meets a criterion.

43 Claims, 4 Drawing Sheets

U.S. PATENT DOCUMENTS

| | | | | |
|---|---|---|---|---|
| 6,519,513 | B2 | 2/2003 | Nakagawa et al. | 701/22 |
| 6,555,991 | B1 | 4/2003 | Zettel et al. | 320/137 |
| 6,574,535 | B1* | 6/2003 | Morris et al. | 701/22 |
| 6,662,096 | B2 | 12/2003 | Komiyama et al. | 701/54 |
| 6,715,572 | B2 | 4/2004 | Shimabukuro et al. | 180/65.6 |
| 6,741,923 | B2* | 5/2004 | Katakura et al. | 701/101 |
| 6,768,621 | B2 | 7/2004 | Arnet et al. | 361/93.1 |
| 6,809,429 | B1 | 10/2004 | Frank | 290/40 C |
| 6,879,054 | B2 | 4/2005 | Gosselin | 290/40 C |
| 6,909,200 | B2 | 6/2005 | Bouchon | 307/10.1 |
| 6,991,052 | B2 | 1/2006 | Nogi et al. | 180/65.235 |
| 7,017,348 | B2 | 3/2006 | Tajima et al. | 60/706 |
| 7,024,290 | B2* | 4/2006 | Zhao et al. | 701/22 |
| 7,178,618 | B2* | 2/2007 | Komeda et al. | 180/65.275 |
| 7,223,203 | B2* | 5/2007 | Yamazaki et al. | 477/15 |
| 7,315,774 | B2* | 1/2008 | Morris | 701/53 |
| 7,480,555 | B2* | 1/2009 | Jacobs | 701/101 |
| 7,549,292 | B2* | 6/2009 | Peck et al. | 60/773 |
| 7,562,730 | B2* | 7/2009 | Shimizu et al. | 180/65.1 |
| 7,577,507 | B2* | 8/2009 | Morris | 701/51 |
| 2002/0065165 | A1 | 5/2002 | Lasson et al. | 477/3 |
| 2004/0020206 | A1* | 2/2004 | Sullivan et al. | 60/670 |
| 2004/0074682 | A1 | 4/2004 | Fussey et al. | 180/65.21 |
| 2004/0164616 | A1 | 8/2004 | Obayashi et al. | 307/18 |
| 2004/0174125 | A1 | 9/2004 | Wilton et al. | 318/139 |
| 2005/0024061 | A1 | 2/2005 | Cox et al. | 324/426 |
| 2005/0057098 | A1* | 3/2005 | Bouchon | 307/10.1 |
| 2005/0080537 | A1 | 4/2005 | Cawthorne et al. | 701/51 |
| 2005/0246076 | A1 | 11/2005 | Chen et al. | 701/22 |
| 2006/0108163 | A1 | 5/2006 | Kitano et al. | 180/65.26 |
| 2007/0074516 | A1* | 4/2007 | Peck et al. | 60/772 |
| 2007/0149348 | A1 | 6/2007 | Holmes et al. | 477/3 |
| 2008/0059013 | A1 | 3/2008 | Liu et al. | 701/22 |
| 2008/0122228 | A1 | 5/2008 | Liu et al. | 290/40 C |
| 2008/0236913 | A1* | 10/2008 | Ichimoto | 180/65.2 |

FOREIGN PATENT DOCUMENTS

| | | |
|---|---|---|
| EP | 0867323 A2 | 9/1998 |
| GB | 2267364 A | 12/1993 |
| JP | 1144101 A2 | 6/1989 |
| WO | WO 02/058209 A | 7/2002 |
| WO | WO 2004/071800 A1 | 8/2004 |

OTHER PUBLICATIONS

Lin et al., "Control System Development for an Advanced-Technology Medium-Duty Hybrid Electric Truck", International Truck & Bus Meeting & Exhibition, Fort Worth TX, Nov. 2003, 10 pages unnumbered.

Chen, et al., "Learning Energy Management Strategy for Hybrid Electric Vehicles", IEEE, pp. 427-432, 2005.

Lin et al., "A Stochastic Control Strategy for Hybrid Electric Vehicles", Proceeding of the 2004 American Control Conference, Boston, MA, Jun. 30-Jul. 2, 2004, pp. 4710-4715.

C.C. Chan, "The State of the Art of Electric and Hybrid Vehicles", Proceedings of the IEEE, vol. 90, No. 2, Feb. 2002, pp. 247-275.

Powers, William F.; Nicastri, Paul R., Automotive Vehicle Control Challenges in the Twenty-First Century, IFAC, 1999, pp. 11-29, $14^{th}$ Triennial World Congress, Beijing, P.R. China.

Barsali, Stefano, Miulli, Carmine, Possenti, Andrea, A Control Strategy to Minimize Fuel Consumption of Series Hybrid Electric Vehicles, IEEE Transactions on Energy Conversion, Mar. 2004, pp. 187-195, vol. 19, Issue No. 1, IEEE.

Kheir, Naim, A., Salman, Mutasim, A., Schouten, Niels J., Emissions and Fuel Economy Trade-Off for Hybrid Vehicles Using Fuzzy Logic, Mathematics and Computers in Simulation, 2004, pp. 155-172, vol. 66, Elsevier B.V.

Wayne, W. Scott, Clark, Nigel N., Nine, Ralph, D., Elefante, Dennis, A Comparison of Emissions and Fuel Economy from Hybrid-Electric and Conventional-Drive Transit Buses, Energy and Fuels, 2004, pp. 257-270, vol. 18, American Chemical Society.

Stengel, Robert, Optimal Control and Estimation MAE 546, 2006, pp. 1-5, Princeton University School of Engineering and Applied Science, USA.

Rahman, Z., Butler, K.L., Ehsani, M., A Study of Design Issues on Electrically Peaking Hybrid Electric Vehicle for Diverse Urban Driving Patterns, Society of Automotive Engineers, SAE, 1999-01-1151, 9 pages.

Yamamoto, M., Yoneya, Shuhei, Matsuguchi, Tatsuya, and Kumagai, Yasuaki, Optimization of Heavy Duty Diesel Engine Parameters for Low Exhaust Emissions Using the Design of Experiments, SAE, 2002-01-1148 6 pages.

Johnson, Valerie. H. Wipke, Keith B., Rausen, David J., HEV Control Strategy for Real-Time Optimization of Fuel Economy and Emissions, SAE paper 2000-01-1543, 12 pages.

Shen, Shuiwen, Veldpaus, Frans E., Analysis and Control of a Flywheel Hybrid Vehicular Powertrain, IEEE Trans. On Control Systems Technology, pp. 645-660, vol. 12, No. 5, Sep. 2004.

Rao, S.S., Engineering Optimization—Theory and Practice, $3^{rd}$ Ed., New Age International Publishers, 1996, pp. 616-667.

Bellman, R.E., Applied Dynamic Programming, Princeton University Press, Princeton, NJ, 1957, pp. 12-25.

Won, J.S., et al., Intelligent Energy Management Agent for a Parallel Hybrid Vehicle, American Control Conference, 2003, pt. 3, pp. 2560-25655.

Schouten, N.J., Energy Management Strategies for Parallel Hybrid Vehicles Using Fuzzy Logic, Control Engineering Practice, Elsevier Science Ltd., vol. 11, 2003, pp. 171-177.

Piccolo, A., et al., Optimisation of Energy Flow Management in Hybrid Electric Vehicles via Genetic Algorithms, 2001, IEEE/ASME International Conference on Advanced Intelligent Mechatronics, Proceedings, pp. 434-439.

Drozdz, Piotr, Siegenthaler, Richard, Hybrid Powertrain Architecture for Medium Duty Commercial Vehicles, EVS 18, Berlin, 2001, 9 pages.

Supplementary European Search Report for Application No. EP 07800541, including 5 pages (unnumbered), Jul. 25, 2002.

* cited by examiner

PROCESS AND APPARATUS FOR REDUCING NITROGEN OXIDE EMISSIONS IN GENSET SYSTEMS

BACKGROUND OF THE INVENTION

1. Field of Invention

This invention relates to generator/engine sets (gensets) and more particularly to methods and apparatus for reduction of nitrogen oxides and other harmful emitted gases in genset systems.

2. Description of Related Art

In conventional engines, high combustion chamber temperatures can provide conditions that facilitate the formation of nitrogen oxides ($NO_x$). It is well known that nitrogen oxides have harmful effects on the environment.

To reduce the formation of nitrogen oxides in combustion engines such engines typically employ an exhaust gas recirculation system which feeds exhaust gas, particularly carbon dioxide, back into the combustion chamber to reduce the amount of oxygen drawn into the combustion chamber and thereby reduce one of the components required for combustion, to reduce combustion chamber temperatures. With lower combustion chamber temperatures, less nitrogen oxides are formed. However, with less oxygen being drawn into the combustion chamber, the available power from the engine is reduced.

Typically the recirculation of exhaust gas back into the combustion chamber is controlled by an EGR valve that varies the amount of exhaust gas recirculated into the combustion chamber. When particularly demanding loads are placed on the engine, EGR systems typically disable the EGR valve to prevent exhaust gas from being recirculated so that the engine can develop a suitable power output.

Certain applications of engines such as genset applications place continuous loads on an engine. If the genset is used in a hybrid vehicle, for example, additional loads for driving the vehicle are placed on the engine and these additional loads can require the engine to face greater transient loads overall, and these transient loads can require the engine to develop more power which requires more oxygen which can be obtained by simply disabling the recirculation of exhaust gas. This however, results in increased $NO_x$ emissions. The loads imposed by generators on engines in hybrid vehicles can be quite large and engines can require large variations in motive load, which can result in frequent disabling of the recirculation of exhaust gases causing a corresponding increase in production of $NO_x$ emissions.

SUMMARY OF THE INVENTION

In accordance with one aspect of the invention there is provided an apparatus for reducing nitrogen oxide emissions in a genset. The apparatus includes an, engine and a generator and a shaft coupled to the engine and the generator. The apparatus also includes a generator controller operably configured to control power transfer between the generator and the shaft, an engine controller operably configured to control energy transfer between the engine and the shaft and a system controller responsive to a shaft speed correction (SSC) signal representing a shaft speed correction to reach a desired energy transfer to the shaft. The system controller causes the generator controller to cause the generator to reduce load on the shaft while causing the engine controller to cause the engine to seek a steady state shaft speed associated with the desired energy transfer to the shaft, when the shaft speed correction (SSC) signal meets a criterion.

The system controller may be operably configured to cause the generator controller to reduce load on the shaft while causing the engine controller to cause the engine to seek the steady state shaft speed when the shaft speed correction (SSC) signal exceeds a value.

The system controller may be operably configured to cause the generator controller to reduce load on the shaft while causing the engine controller to cause the engine to seek the steady state shaft speed when the shaft speed correction (SSC) signal exceeds a pre-defined value.

The engine controller may be operably configured to control the engine in response to an injection quantity command (IQCM) signal and to control the generator in response to an energy transfer command (ETCM) signal. The system controller may be operable to produce the injection quantity command (IQCM) signal and the energy transfer command (ETCM) signal, in response to an energy transfer setpoint (ETS) signal representing an energy transfer setpoint and said shaft speed correction signal, wherein said shaft speed correction signal represents a difference between a shaft speed of said shaft and a shaft speed setpoint associated with the energy transfer setpoint.

The system controller may include a processor operably configured to produce the generator shaft speed correction (SSC) signal in response to a shaft speed setpoint (SSS) signal representing a shaft speed for the energy transfer setpoint and in response to a shaft speed (SS) signal representing a shaft speed.

The processor may be operably configured to produce the shaft speed setpoint (SSS) signal.

The apparatus may include a lookup table and the processor may be operably configured to find a shaft speed setpoint (SSS) associated with the energy transfer setpoint (ETS) in the lookup table.

The system controller may include a processor operably configured to produce a steady state injection quantity (SSIQ) signal in response to the energy transfer setpoint (ETS) signal and operably configured to produce an injection quantity correction (IQC) signal in response to the shaft speed correction (SSC) signal.

The processor may be operably configured to find a steady state injection quantity (SSIQ) associated with the energy transfer setpoint (ETS) signal in the lookup table.

The processor may be operably configured to apply a steady state response function to the shaft speed correction (SSC) signal.

The processor may be configured to apply an integral control function to the shaft speed correction (SSC) signal.

The processor may be operably configured to produce an energy transfer correction (ETC) signal in response to the shaft speed correction (SSC) signal.

The processor may be operably configured to apply a transient response function to the shaft speed correction (SSC) signal.

The processor may be operably configured to apply at least one of a proportional control function, a derivative control function and a proportional/derivative control function to the shaft speed correction (SSC) signal.

In accordance with another aspect of the invention, there is provided a process for reducing nitrogen oxide emissions in a genset comprising an engine and a generator and a shaft coupled to the engine and generator. The process involves causing the generator to reduce load on the shaft while causing the engine to seek a steady state shaft speed for a desired energy transfer to the shaft when a shaft speed correction (SSC) signal representing a shaft speed correction to reach the desired energy transfer meets a criterion.

The process may involve causing the generator to reduce load on the shaft while causing the engine to seek the steady state shaft speed when the shaft speed correction (SSC) signal exceeds a value.

The process may involve causing the generator to reduce load on the shaft while causing the engine to seek the steady state shaft speed when the shaft speed correction (SSC) signal exceeds a pre-defined value.

The genset may include an engine controller operable to control the engine in response to an injection quantity command (IQCM) signal and a generator controller operable to control the generator in response to an energy transfer command (ETCM) signal. The process may then involve producing the injection quantity command (IQCM) signal and the energy transfer command (ETCM) signal, in response to an energy transfer setpoint (ETS) signal representing an energy transfer setpoint and said shaft speed correction signal, said shaft speed correction signal representing a difference between a shaft speed of said shaft and a shaft speed setpoint associated with the energy transfer setpoint such that the energy transfer command (ETCM) signal causes the generator to reduce load on the shaft while the injection quantity signal causes the engine to seek the steady state shaft speed when the shaft speed correction signal meets a criterion.

The criterion may include a shaft speed threshold value such that the energy transfer command (ETCM) signal causes the generator to reduce load on the shaft while the injection quantity command (IQCM) signal causes the engine to seek the steady state shaft speed when the shaft speed correction (SSC) signal reaches the shaft speed threshold value.

The process may further involve producing the shaft speed correction (SSC) signal in response to a shaft speed setpoint (SSS) signal representing a shaft speed for the energy transfer setpoint and in response to a shaft speed (SS) signal representing the shaft speed.

Producing the shaft speed correction (SSC) signal may involve producing the shaft speed setpoint (SSS) signal.

Producing the shaft speed setpoint (SSS) signal may involve finding a shaft speed associated with the energy transfer setpoint (ETS) in a lookup table.

Producing the injection quantity command (IQCM) signal may involve producing a steady state injection quantity (SSIQ) signal in response to the energy transfer setpoint (ETS) signal and producing an injection quantity correction (IQC) signal in response to the shaft speed correction (SSC) signal.

Producing the steady state injection quantity (SSIQ) signal may involve finding a steady state injection quantity (SSIQ) associated with the energy transfer setpoint (ETS) signal in a lookup table.

Producing the injection quantity correction (IQC) signal may involve applying a steady state response function to the shaft speed correction (SSC) signal.

Applying the steady state response function may involve applying an integral control process to the shaft speed correction (SSC) signal.

Producing the energy transfer command (ETCM) signal involves producing an energy transfer correction (ETC) signal in response to the shaft speed (SS) signal.

Producing the energy transfer correction (ETC) signal may involve applying a transient response function to the shaft speed correction (SSC) signal.

Applying the transient response function may involve applying at least one of a proportional control function, a derivative control function and a proportional derivative control function to the shaft speed correction signal.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
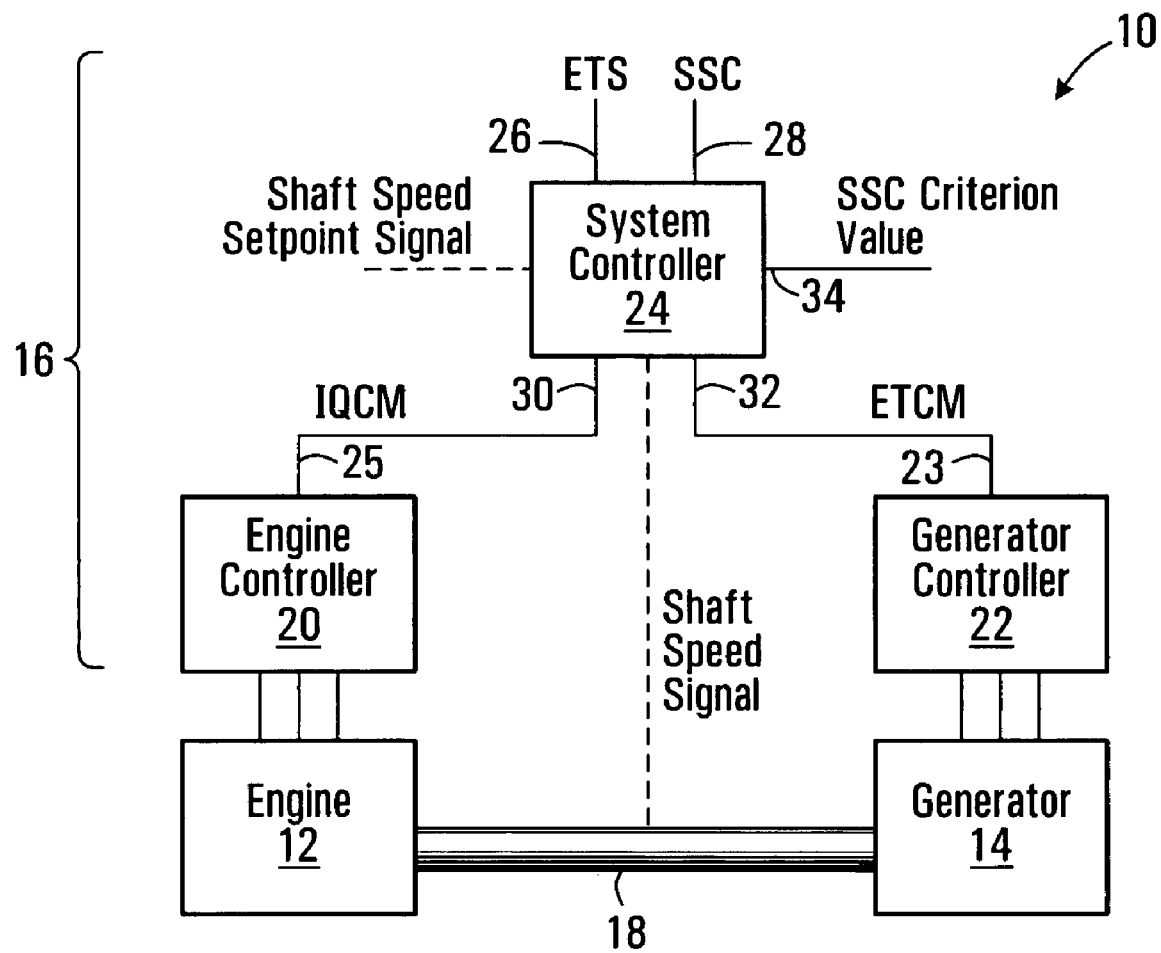
FIG. 1 is a block diagram of a system for reducing nitrogen oxides in a genset, according to a first embodiment of the invention.

Referring to FIG. 1, a generator set, also known as a genset, according to a first embodiment of the invention is shown generally at 10. In this embodiment, the genset includes an internal combustion engine 12, an electric generator 14, and a control system shown generally at 16. The engine 12 and generator 14 are, in this embodiment, coupled to a rotatable shaft 18 such that the engine can transfer energy to the generator. The shaft 18 may be further connected to other devices requiring motive power such as a drive shaft of a hybrid vehicle, for example.

In this embodiment, the control system 16 includes an engine controller 20, a generator controller 22, and a system controller 24. In some embodiments, the engine controller 20 may be incorporated on the engine 12 and the generator controller 22 may be incorporated on the generator 14. The system controller 24 may be incorporated into the engine controller 20 or the generator controller 22, or as a separate device, or as part of a main controller of a hybrid vehicle, for example.

The system controller 24 is operable to receive an energy transfer setpoint (ETS) signal at an ETS signal input 26 and to receive a shaft speed correction (SSC) signal at a SSC signal input 28. The system controller 24 further has an injection quantity command (IQCM) signal output 30 and a energy transfer command (ETCM) signal output 32 for producing an IQCM signal for receipt by the engine controller 20 and for producing an ETCM signal for receipt by the generator controller 22. Both, the IQCM and the ETCM signals, are produced by the system controller 24 in response to the ETS and SSC signals received at the inputs 26 and 28.

The ETS signal may be produced by an external controller such as a system controller (not shown) of a hybrid vehicle on which the genset is used. The ETS signal may be produced as a result of execution of an optimization algorithm executing on the external controller, for example. The external controller may sense an accelerator pedal position, for example and based on the sensed accelerator pedal position may produce an optimum energy transfer setpoint signal, i.e., the ETS signal, for use by the system controller 24. The ETS signal may be a digital or analog signal representing the energy transfer setpoint. The energy transfer setpoint may represent the total power desired of the engine to service the load required by the drive train of a hybrid vehicle in power or torque units, for example.

The SSC signal received by the system controller 24 may be produced by the external controller, by a separate device or by the system controller 24 itself as will be described below. Generally, the SSC signal represents a difference between a shaft speed setpoint signal which may be derived from the ETS signal and a current shaft speed signal representing the current speed of the shaft 18. In other words, the SSC signal represents a difference between a desired shaft RPM and a current shaft RPM. Since the ETS signal represents an energy transfer setpoint, the SSC signal may be derived from the ETS signal where the relationship between energy transfer from the engine 12 and the generator 14 to the shaft speed is known. A simple lookup table for example may provide an association of energy transfer values with shaft speed.

The ETCM signal may be analog or digital for example, as determined by an input 23 on the generator controller 22 for receiving such signal. The ETCM signal may represent a desired torque in a range. The range may be between −300 Newton-meters to +300 Newton meters, for example, depending on the power required to achieve desired acceleration in the hybrid vehicle and/or power output required of the genset system. The positive and negative range of torque represents the possibility of the generator acting in a motor mode in which it supplies energy to the shaft and the possibility of the generator acting as a true generator in which it receives energy from the shaft. Alternatively, the ETCM signal may represent a desired power in a range such as from −100 kW to +100 kw for example, again depending on the hybrid vehicle and/or genset system.

The IQCM signal may be analog or digital as determined by an input 25 for receiving such signal in the engine controller 20. The IQCM signal may represent a desired injection quantity of fuel or air, for example in a range. The range may be expressed in grams per stroke for example, as determined by the input 25 of the engine controller 20.

Generally, the system controller 24 produces the IQCM and the ETCM signals to cause the generator controller 22 to cause the generator 14 to reduce its load on the shaft 18, while causing the engine controller 20 to cause the engine 12 to seek a steady-state shaft speed associated with a desired energy transfer to the shaft as determined by the ETS signal, when the SSC signal meets a criterion.

The criterion may be that the SSC signal exceeds a value received at a value input 34 of the system controller 24 from an external controller (not shown) that may be controlling a hybrid vehicle, for example, if the genset is used in such a vehicle. Alternatively, the value may be a predefined value set by a user, for example.

Figure 2:
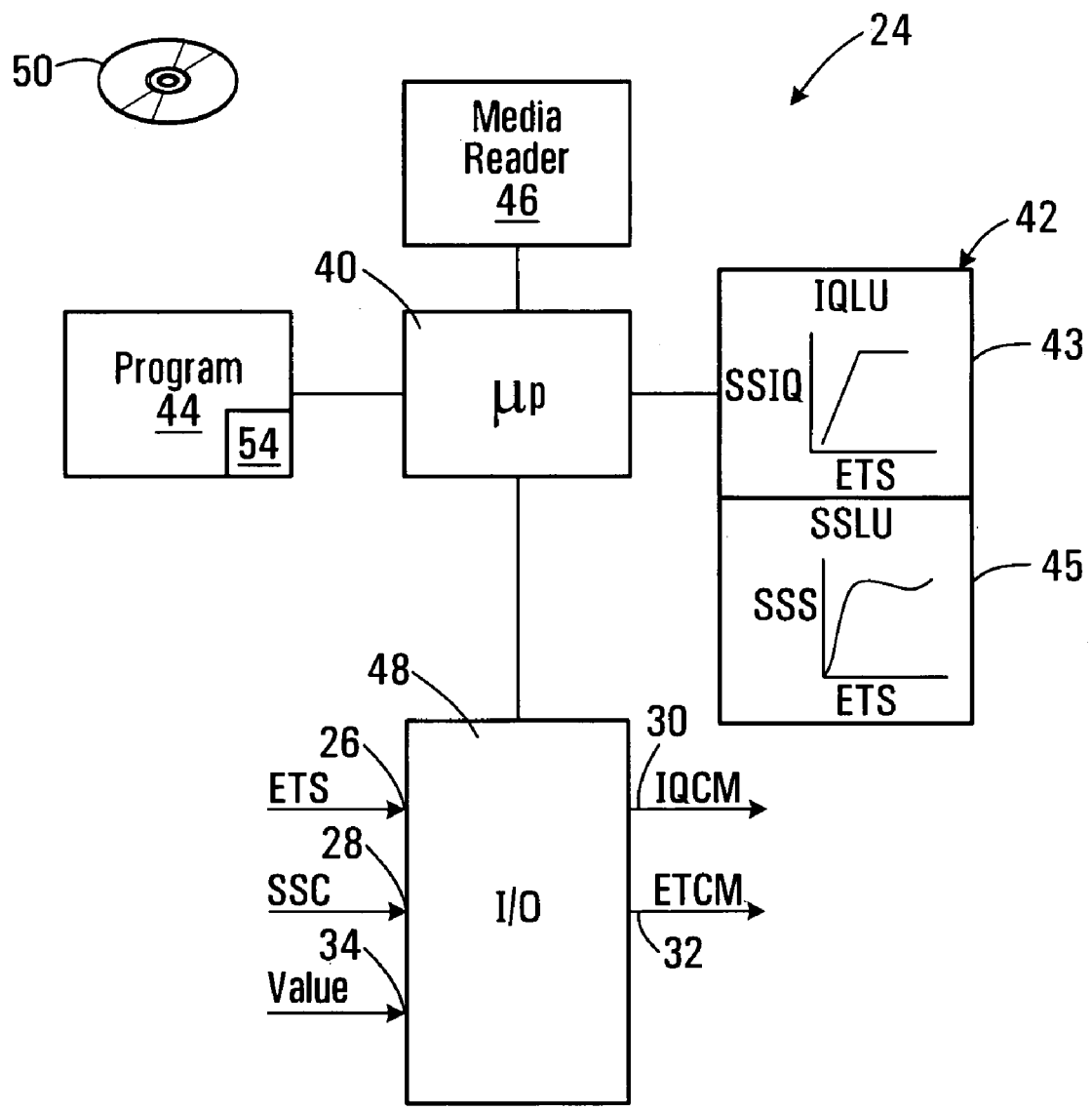
FIG. 2 is a block diagram of a system controller of the system shown in FIG. 1.

Referring to FIG. 2, the system controller 24 is shown in greater detail. In this embodiment, the system controller 24 includes a processor circuit comprising a microprocessor 40 connected to parameter memory 42, program memory 44, a media reader 46, and an input/output (I/O) port 48.

The parameter memory 42 includes an injection quantity lookup (IQLU) table 43 and a shaft speed lookup table (SSLU) table 45. The injection quantity lookup table (IQLU) 43 associates various steady state injection quantities (SSIQ) with corresponding energy transfer setpoints. Therefore, given an energy transfer setpoint, a corresponding steady state injection quantity (SSIQ) can be obtained from the IQLU table 43. The shaft speed lookup table (SSLU) 45 associates various shaft speed setpoints with corresponding energy transfer setpoints. Therefore, given an energy transfer setpoint, a corresponding shaft speed setpoint (SSS) can be obtained from the SSLU table 45.

The I/O port 48 provides the ETS signal input 26, the SSC signal input 28, and the value input 34, and provides the IQCM output 30 and the ETCM output 32. The microprocessor 40 writes values to the I/O port 48 to cause the signals at the IQCM output 30 and the ETCM output 32 to have desired analog or digital values for receipt by the engine controller 20 and generator controller 22, respectively, shown in FIG. 1. Similarly, the I/O port 48 is configured to receive at the ETS signal input 26, the SSC signal input 28, and the value input 34, respective analog or digital signals representing the ETS and the SSC signals, and the SSC criterion value signal. As stated above, these signals may be provided by other components of an overall system in which the genset 10 is used, by a separate system or by the system controller 24 itself.

The system controller 24 generates the ICQM signal and the ETCM signal by executing instructions that may be provided to the microprocessor 40 on a computer-readable medium 50, such as a CD-ROM, or EPROM (not shown) for example. The computer-readable medium 50 may be received in the media reader 46 to thereby transfer the codes from the computer-readable medium 50 to the program memory 44. Alternatively, the program memory 44 may be preloaded with the codes, or the media reader 46 may be replaced with an interface for connection to a network, such as the internet, for example, for receiving codes for directing the system controller 24 to carry out the functions described herein.

Figure 3:
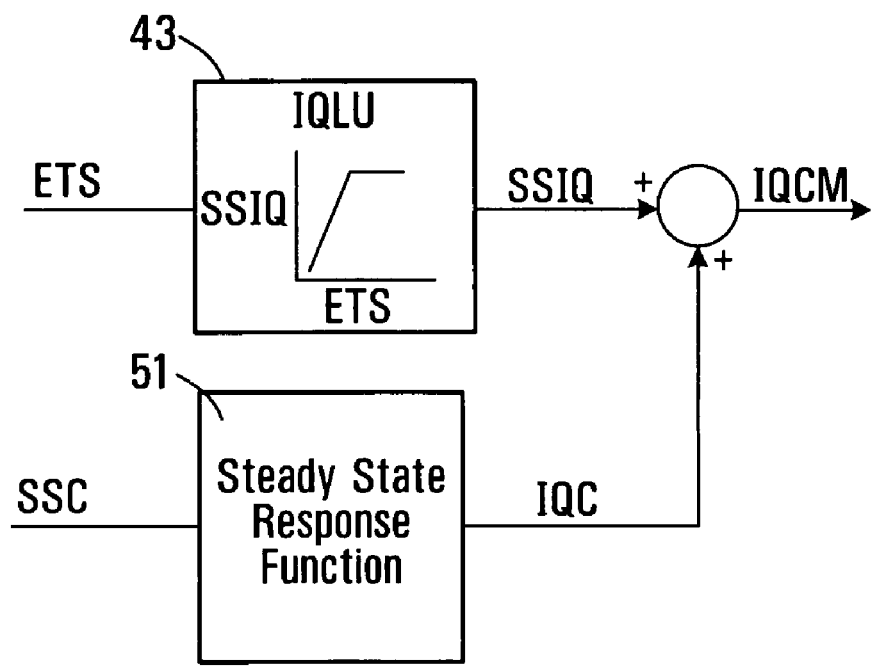
FIG. 3 is a process diagram illustrating a process executed by the processor circuit shown in FIG. 2 to produce an injection quantity command signal.

Referring to FIG. 2 and 3, the codes stored in the program memory 44 shown in FIG. 2 direct the system controller 24 to produce the IQCM signal in response to the ETS signal received at the ETS signal input 26 and the SSC signal received at SSC signal input 28. To produce the IQCM signal, the system controller 24 is directed by the codes stored in the program memory 44 to produce a steady state injection quantity (SSIQ) signal and to produce an injection quantity correction (IQC) signal and to combine these signals, by digital or analog addition or subtraction, for example, to produce the IQCM signal.

The SSIQ signal is produced by causing the system controller 24 to address the IQLU table 43 to find an SSIQ value associated with the current ETS signal received by the system controller at the ETS signal input 26.

The IQC signal is produced by subjecting the SSC signal received by the system controller 24 at the SSC signal input 28, to a steady state response (SSR) function 51. The SSR function 51 may be an integral control function, for example. For example, the SSR function 51 may integrate the SSC signal over time such that the IQC signal changes relatively slowly in response to the changes in the SSC signal. In general, the IQC signal corrects the SSIQ signal determined from the IQLU table 43 to compensate for errors in injection quantity caused by engine wear, fuel quality, altitude changes, engine temperature, ambient temperature, engine intake restrictions, engine exhaust restrictions, fuel type including not only liquid alternative fuels but gaseous alternative fuels such as, natural gas, hydrogen and blends thereof, fluctuation in cetane numbers fuels, fluctuation in octane numbers of fuels, fluctuation in heating values, variation in emulsified fuels to which water is added, inadvertent additions of water, inertial force variations, orientation changes, injector wear, two-phase flow propane, particulates in fuel and driver behaviour and/or other conditions, for example.

Figure 4:
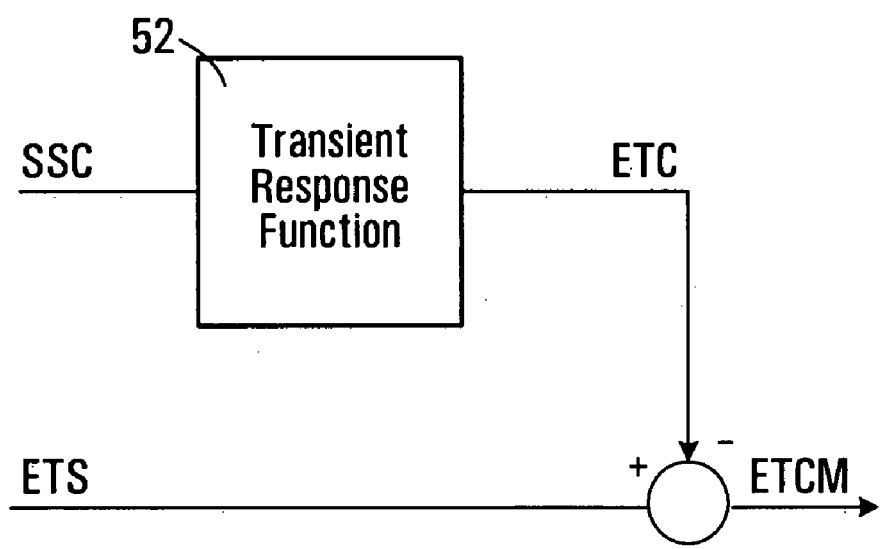
FIG. 4 is a process diagram illustrating a process executed by the processor circuit of FIG. 2 for producing an energy transfer command signal.

Referring to FIGS. 2 and 4, the codes stored in the program memory 44 shown in FIG. 2 also direct the system controller 24 to produce the ETCM signal in response to the SSC signal received at the SSC signal input 28 and the ETS signal received at the ETS signal input 26. To produce the ETCM signal, the system controller 24 is directed by the codes stored in program memory 44 to produce an energy transfer correction (ETC) signal in response to the SSC signal and to combine the ETC signal with the ETS signal by digital or analog addition or subtraction, for example, to produce the ETCM signal.

The ETC signal is produced by the system controller 24 by applying a transient response (TR) function 52 to the SSC signal. The TR function 52 may include at least one of a proportional control function, a derivative control function or a combination of these two functions, for example. For example, with a TR function 52 implemented as a proportion function, the SSC signal may be multiplied by a gain factor to produce a product and this product may act as the ETC signal. Generally, the ETC signal serves to modify the ETS signal to adjust the ETS signal to compensate for rapid changes in the SSC signal.

Figure 5:
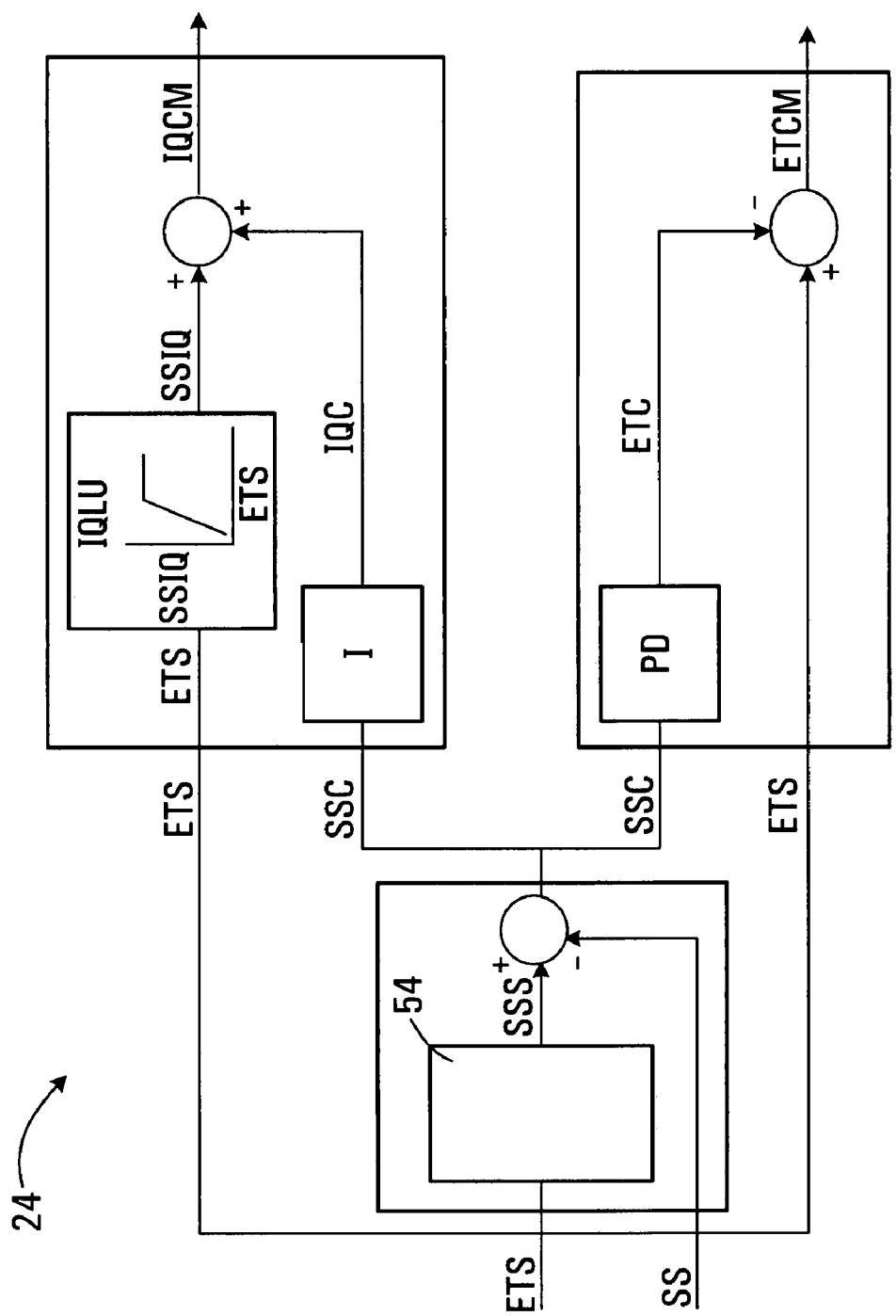
FIG. 5 is a process diagram illustrating a process executed by the processor circuit shown in FIG. 2 incorporating the processes of FIGS. 3 and 4 and a further process for determining a shaft speed correction signal for use by the processes of FIGS. 3 and 4.

In another embodiment, referring to FIGS. 2 and 5, the system controller 24 may be further configured with codes, contained in the program memory 44 shown in FIG. 2, for directing the system controller to produce the SSC signal. To produce the SSC signal, the codes direct the system controller 24 to produce a shaft speed setpoint signal (SSS) and to produce the SSC signal by combining the SSS signal and a shaft speed signal (SS) by digital or analog subtraction, for example, of the SS signal from the SSS signal. To produce the SSS signal, the processor is directed by a block of codes 54 contained in the program memory 44, to use the ETS signal to address the SSLU table 45 to find an SSS value associated with the current ETS signal.

It will be appreciated that overall, it can be seen that with the additional feature of producing the SSC signal, the system controller 24 may be regarded as producing the IQCM signal and the ETCM signal in response to the ETS signal and the SS signal.

Generally, the above components implement a fast inner power control loop and an outer speed control loop for making fast but temporary load adjustments to the speed of the shaft and the power extracted therefrom or provided thereto and implement an engine load compensation (e.g. reduction) scheme synchronized with requested generator load, with a slower self-adjusting speed control loop. This provides for fast shaft speed response, fast shaft power response, and low $NO_x$ production by the internal combustion engine due to reduction of speed-related injection quantity transients resulting in a better-controlled fueling of the engine.

At steady speeds, rapid load changes at the shaft 18 can be serviced by modifying the injection quantity supplied to the engine as determined by the engine controller. Synchronization of engine load and engine load compensation effected by reducing generator power demand can be performed very rapidly such that operating speed of the shaft is not affected to any significant degree. Engine load compensation at a steady speed does not usually result in high $NO_x$ emissions because load changes at a given speed are typically relatively small, therefore injection quantity values are not excessively high.

Rapid shaft speed changes are obtained by temporarily compromising power control in favor of speed control, during operating speed setpoint increases. This is done by causing the load imposed on the engine by the generator to be reduced while maintaining engine fuelling (i.e. injection quantity) relatively constant. Since the load imposed by the generator is reduced, yet the engine is still being fuelled at the same rate, the power that would otherwise have been provided to the generator is used to increase the speed of the shaft and hence, the speed of the engine. Sacrificing power supplied to the generator during speed increases allows for low $NO_x$ emissions and allows speed increases to occur more rapidly. Also, since fuelling is maintained at the same rate while the load imposed by the generator is reduced, there is no increase in fuel consumption. The system is therefore more energy efficient.

What is claimed is:

1. An apparatus for reducing nitrogen oxide emissions in a genset comprising an engine and a generator and a shaft coupled to the engine and the generator, the apparatus comprising:
    a generator controller operably configured to control power transfer between the generator and the shaft;
    an engine controller operably configured to control energy transfer between the engine and the shaft;
    a system controller responsive to a shaft speed correction (SSC) signal representing a shaft speed correction to reach a desired energy transfer to the shaft, for causing said generator controller to cause the generator to reduce load on the shaft while causing said engine controller to cause the engine to seek a steady state shaft speed associated with said desired energy transfer to the shaft, when said shaft speed correction (SSC) signal meets a criterion.

2. The apparatus of claim 1 wherein said system controller is operably configured to cause said generator controller to reduce load on the shaft while causing said engine controller to direct the engine to seek said steady state shaft speed when said shaft speed correction (SSC) signal exceeds a value.

3. The apparatus of claim 1 wherein said system controller is operably configured to cause said generator controller to reduce load on the shaft while causing said engine controller to direct the engine to seek said steady state shaft speed when said shaft speed correction (SSC) signal exceeds a pre-defined value.

4. The apparatus of claim 1 wherein said engine controller is operably configured to control the engine in response to an injection quantity command (IQCM) signal and said generator controller is operably configured to control the generator in response to an energy transfer command (ETCM) signal and wherein said system controller is operable to produce said injection quantity command (IQCM) signal and said energy transfer command (ETCM) signal, in response to:
    an energy transfer setpoint (ETS) signal representing an energy transfer setpoint; and
    said shaft speed correction signal, wherein said shaft speed correction signal represents a difference between a shaft speed and a shaft speed setpoint associated with said energy transfer setpoint.

5. The apparatus of claim 4 wherein said system controller includes a processor operably configured to produce said generator shaft speed correction (SSC) signal in response to a shaft speed setpoint (SSS) signal representing a shaft speed for said energy transfer setpoint and in response to a shaft speed (SS) signal representing a shaft speed.

6. The apparatus of claim 5 wherein said processor is operably configured to produce said shaft speed setpoint (SSS) signal.

7. The apparatus of claim 6 further comprising a lookup table and wherein said processor is operably configured to find a shaft speed setpoint (SSS) associated with said energy transfer setpoint (ETS) in said lookup table.

8. The apparatus of claim 1 wherein said system controller comprises a processor operably configured to produce a steady state injection quantity (SSIQ) signal in response to said energy transfer setpoint (ETS) signal and operably configured to produce an injection quantity correction (IQC) signal in response to said shaft speed correction (SSC) signal.

9. The apparatus of claim 8 further comprising a lookup table and wherein said processor is operably configured to find a steady state injection quantity (SSIQ) associated with said energy transfer setpoint (ETS) signal in said lookup table.

10. The apparatus of claim 8 wherein processor is operably configured to apply a steady state response function to said shaft speed correction (SSC) signal.

11. The apparatus of claim 10 wherein said processor is operably configured to apply an integral control function to said shaft speed correction (SSC) signal.

12. The apparatus of claim 1 wherein said system controller comprises a processor operably configured to produce an energy transfer correction (ETC) signal in response to said shaft speed correction (SSC) signal.

13. The apparatus of claim 12 wherein said processor is operably configured to apply a transient response function to said shaft speed correction (SSC) signal.

14. The apparatus of claim 13 wherein said processor is operably configured to apply at least one of a proportional control function, a derivative control function and a proportional/derivative control function to said shaft speed correction (SSC) signal.

15. An apparatus for reducing nitrogen oxide emissions in a genset comprising an engine and a generator and a shaft coupled to the engine and generator, the apparatus comprising:
   generator control means for controlling power transfer between the generator and the shaft;
   engine control means for controlling energy transfer between the engine and the shaft;
   system control means responsive to a shaft speed correction (SSC) signal representing a shaft speed correction to reach a desired energy transfer to the shaft, for causing said generator control means to cause the generator to reduce load on the shaft while causing said engine control means to cause the engine to seek a steady state shaft speed associated with said desired energy transfer to the shaft, when said shaft speed correction (SCC) signal meets a criterion.

16. The apparatus of claim 15 wherein said system control means is operably configured to cause said generator control means to reduce load on the shaft while causing the engine control means to direct the engine to seek said steady state shaft speed when said shaft speed correction (SSC) signal exceeds a value.

17. The apparatus of claim 15 wherein said system control means is operably configured to cause said generator control means to reduce load on the shaft while causing the engine control means to direct the engine to seek said steady state shaft speed when said shaft speed correction (SSC) signal exceeds a pre-defined value.

18. The apparatus of claim 1 wherein the engine control means is operably configured control the engine in response to an injection quantity command (IQCM) signal and said generator control means is operably configured to control the generator in response to an energy transfer command (ETCM) signal and wherein said system control means is operable to produce said injection quantity command (IQCM) signal and said energy transfer command (ETCM) signal, in response to:
   an energy transfer setpoint (ETS) signal representing an energy transfer setpoint; and
   said shaft speed correction (SSC) signal, wherein said shaft speed correction signal represents a difference between a shaft speed of said shaft and a shaft speed setpoint associated with said energy transfer setpoint.

19. The apparatus of claim 18 wherein said system control means includes means for producing said generator shaft speed correction (SSC) signal in response to a shaft speed setpoint (SSS) signal representing a shaft speed for said energy transfer setpoint and in response to a shaft speed (SS) signal representing a current shaft speed.

20. The apparatus of claim 19 wherein said means for producing said shaft speed correction signal comprises means for producing said shaft speed setpoint (SSS) signal.

21. The apparatus of claim 20 wherein said means for producing said shaft speed setpoint signal comprises a lookup table and means for finding a shaft speed setpoint (SSS) associated with said energy transfer setpoint (ETS) in said lookup table.

22. The apparatus of claim 15 wherein said means for producing said injection quantity command signal comprises means for producing a steady state injection quantity (SSIQ) signal in response to said energy transfer setpoint (ETS) signal and means for producing an injection quantity correction (IQC) signal in response to said shaft speed correction (SSC) signal.

23. The apparatus of claim 22 wherein said means for producing said steady state injection quantity signal comprises a lookup table and means for finding a steady state injection quantity (SSIQ) associated with said energy transfer setpoint (ETS) signal in said lookup table.

24. The apparatus of claim 22 wherein said means for producing said injection quantity correction (IQC) signal comprises means for applying a steady state response function to said shaft speed correction (SSC) signal.

25. The apparatus of claim 24 wherein said means for applying said steady state response function comprises means for applying an integral control function to said shaft speed correction (SSC) signal.

26. The apparatus of claim 15 wherein said means for producing said energy transfer command signal comprises means for producing an energy transfer correction (ETC) signal in response to said shaft speed correction (SSC) signal.

27. The apparatus of claim 26 wherein said means for producing said energy transfer correction signal comprises means for applying a transient response function to said shaft speed correction (SSC) signal.

28. The apparatus of claim 27 wherein said means for applying said transient response function apparatus comprises means for applying at least one of a proportional control function, a derivative control function and a proportional derivative control function to said shaft speed correction (SSC) signal.

29. A process for reducing nitrogen oxide emissions in a genset comprising an engine and a generator and a shaft coupled to the engine and generator, the process comprising:
   causing the generator to reduce load on the shaft while causing the engine to seek a steady state shaft speed for a desired energy transfer to the shaft when a shaft speed correction (SSC) signal representing a shaft speed correction to reach said desired energy transfer meets a criterion.

30. The process of claim 29 wherein causing comprises causing the generator to reduce load on the shaft while causing the engine to seek said steady state shaft speed when said shaft speed correction (SSC) signal exceeds a value.

31. The process of claim 29 wherein causing comprises causing the generator to reduce load on the shaft while causing the engine to seek said steady state shaft speed when said shaft speed correction (SSC) signal exceeds a pre-defined value.

32. The process of claim 29 wherein the genset further comprises an engine controller operable to control the engine in response to an injection quantity command (IQCM) signal and a generator controller operable to control the generator in response to an energy transfer command (ETCM) signal and wherein causing comprises producing said injection quantity command signal and said energy transfer command (ETCM) signal, in response to:

an energy transfer setpoint (ETS) signal representing an energy transfer setpoint; and said shaft speed correction (SSC) signal, wherein said shaft speed correction (SSC) signal represents a difference between a shaft speed of said shaft and a shaft speed setpoint associated with said energy transfer setpoint;

such that said energy transfer command signal causes the generator to reduce load on the shaft while said injection quantity signal causes the engine to seek said steady state shaft speed when said shaft speed correction signal meets a criterion.

33. The process of claim 32 wherein said criterion comprises a shaft speed threshold value such that said energy transfer command (ETCM) signal causes the generator to reduce load on the shaft while said injection quantity signal directs the engine to seek said steady state shaft speed when said shaft speed correction (SSC) signal reaches said shaft speed threshold value.

34. The process of claim 33 further comprising producing said generator shaft speed correction (SSC) signal in response to a shaft speed setpoint (SSS) signal representing a shaft speed for said energy transfer setpoint (ETS) and in response to a shaft speed setpoint (SSS) signal representing said shaft speed.

35. The process of claim 34 wherein producing said shaft speed correction (SSC) signal comprises producing said shaft speed setpoint (SSS) signal.

36. The process of claim 35 wherein producing said shaft speed setpoint (SSS) signal comprises finding said shaft speed associated with said energy transfer setpoint (ETS) in a lookup table.

37. The process of claim 29 wherein producing said injection quantity command signal comprises producing a steady state injection quantity (SSIQ) signal in response to said energy transfer setpoint (ETS) signal and producing an injection quantity correction (IQC) signal in response to said shaft speed correction (SSC) signal.

38. The process of claim 37 wherein producing said steady state injection quantity (SSIQ) signal comprises finding a steady state injection quantity (SSIQ) associated with said energy transfer setpoint (ETS) signal in a lookup table.

39. The process of claim 37 wherein producing said injection quantity correction (IQC) signal comprises applying a steady state response function to said shaft speed correction (SSC) signal.

40. The process of claim 39 wherein applying said steady state response function comprises applying an integral control process to said shaft speed correction (SSC) signal.

41. The process of claim 29 wherein producing said energy transfer command (ETCM) signal comprises producing an energy transfer correction (ETC) signal in response to said shaft speed correction (SSC) signal.

42. The process of claim 41 wherein producing said energy transfer correction (ETC) signal comprises applying a transient response function to said shaft speed correction (SSC) signal.

43. The process of claim 42 wherein applying said transient response function comprises applying at least one of a proportional control function, a derivative control function and a proportional derivative control function to said shaft speed correction (SSC) signal.

* * * * *

UNITED STATES PATENT AND TRADEMARK OFFICE
CERTIFICATE OF CORRECTION

| | | |
|---|---|---|
| PATENT NO. | : 7,728,448 B2 | Page 1 of 1 |
| APPLICATION NO. | : 11/800841 | |
| DATED | : June 1, 2010 | |
| INVENTOR(S) | : Bouchon et al. | |

It is certified that error appears in the above-identified patent and that said Letters Patent is hereby corrected as shown below:

On the title page, insert:
    item --(60) Related U.S. Application Data
    Provisional application No. 60/798,901, filed on May 9, 2006--

Signed and Sealed this
Tenth Day of September, 2013

Teresa Stanek Rea
*Acting Director of the United States Patent and Trademark Office*